Figure 13:
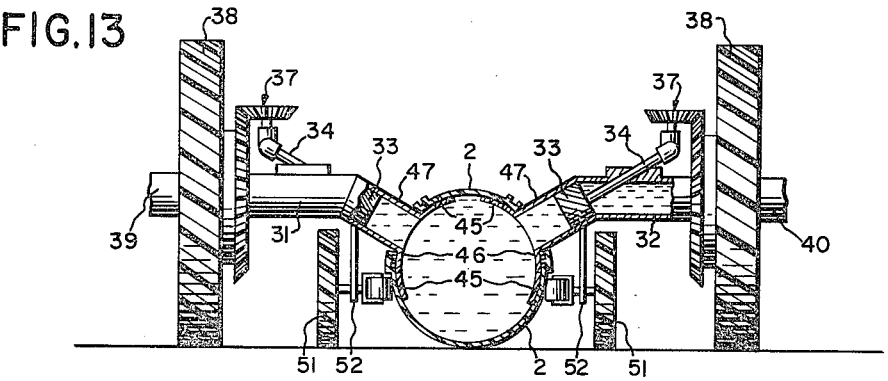

Nov. 16, 1965     S. F. VARIAN     3,217,725
CONDUIT PROVIDED WITH SELF-PROPELLED FITTING
Filed March 31, 1961     3 Sheets-Sheet 1
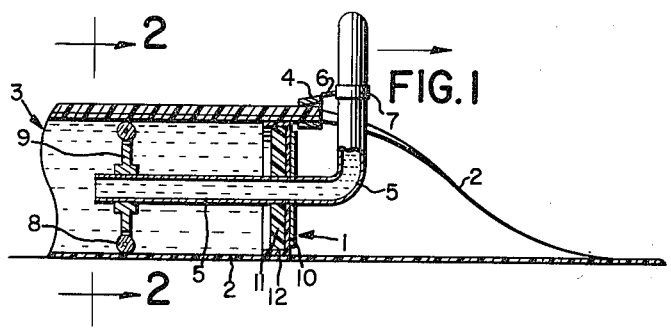
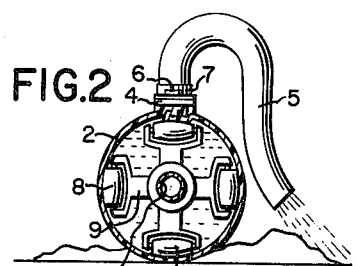
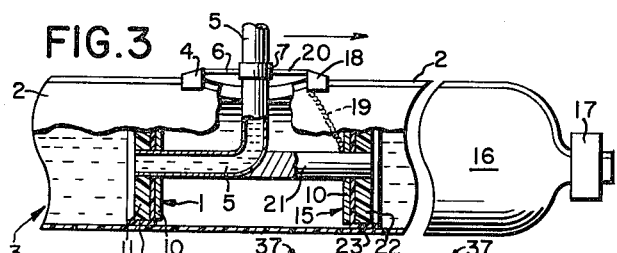
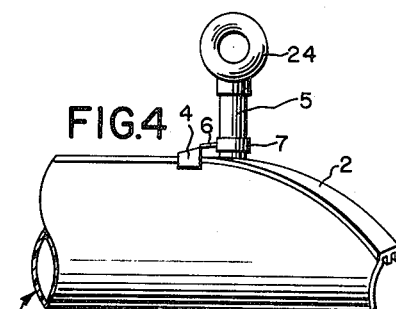
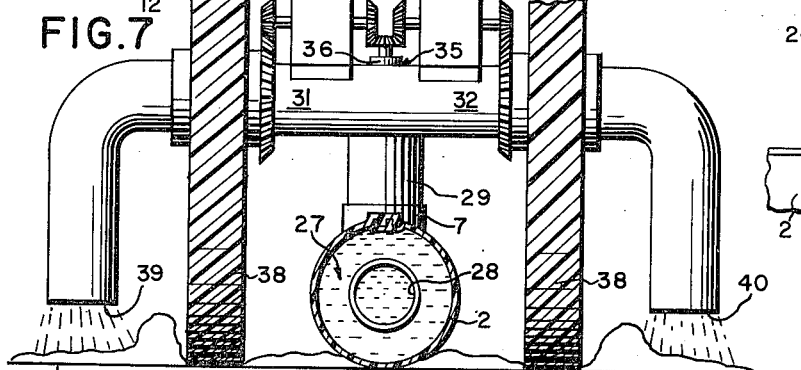
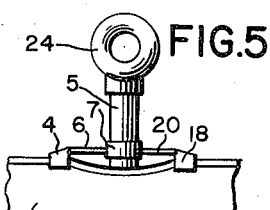
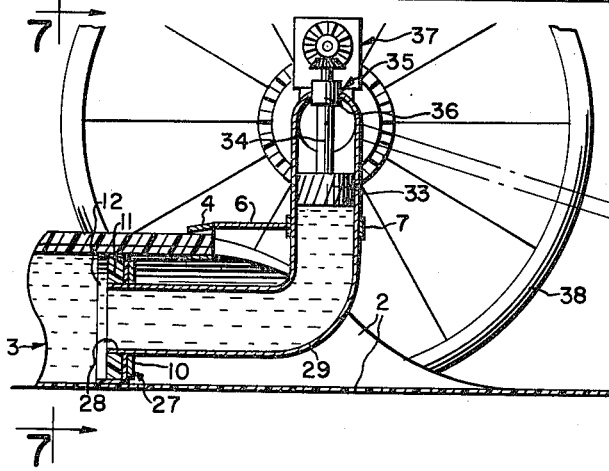
INVENTOR
SIGURD F. VARIAN
BY *Harry E. Aine*
ATTORNEY Nov. 16, 1965    S. F. VARIAN    3,217,725
CONDUIT PROVIDED WITH SELF-PROPELLED FITTING
Filed March 31, 1961    3 Sheets-Sheet 2
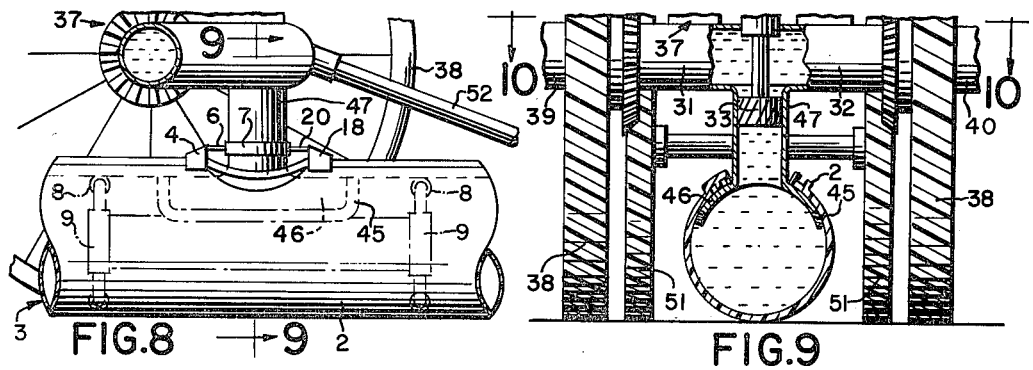
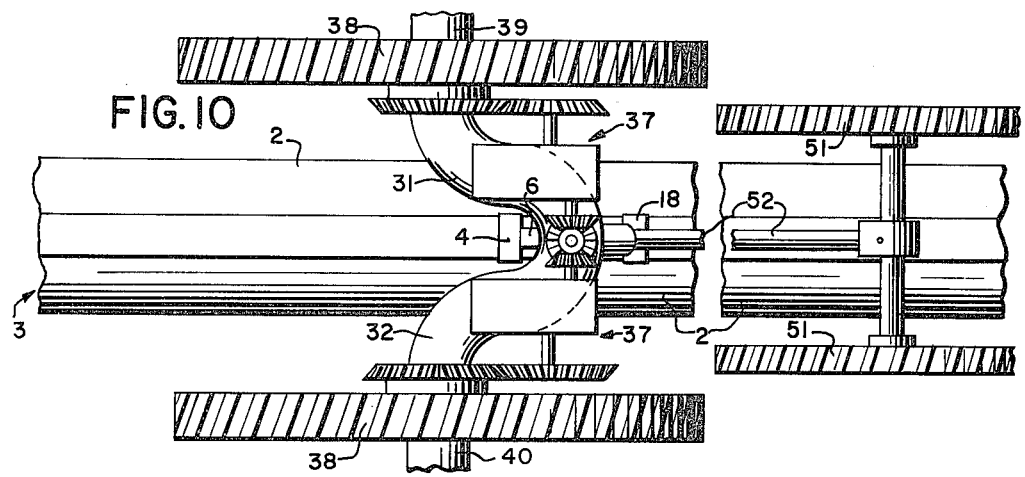
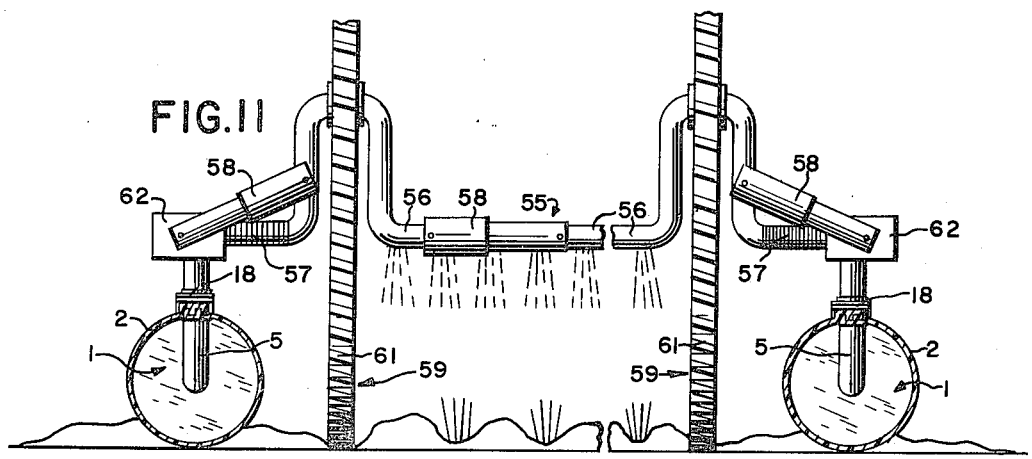
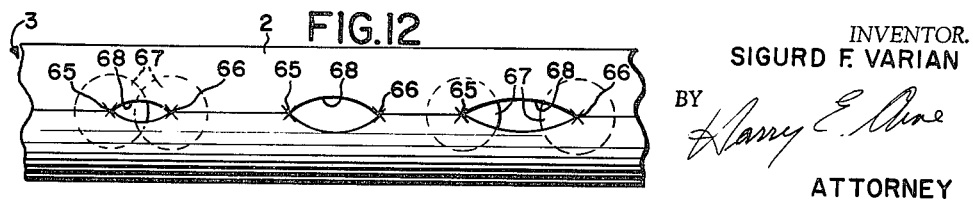
INVENTOR.
SIGURD F. VARIAN
BY
ATTORNEY Nov. 16, 1965  S. F. VARIAN  3,217,725
CONDUIT PROVIDED WITH SELF-PROPELLED FITTING
Filed March 31, 1961  3 Sheets-Sheet 3

INVENTOR.
SIGURD F. VARIAN
BY
ATTORNEY

United States Patent Office 3,217,725
Patented Nov. 16, 1965

3,217,725
CONDUIT PROVIDED WITH SELF-PROPELLED
FITTING
Sigurd F. Varian, 24 Aliso Way, Menlo Park, Calif.
Filed Mar. 31, 1961, Ser. No. 116,212
23 Claims. (Cl. 137—1)

The present invention relates in general to fluid method and apparatus and more specifically to method and apparatus for distributing fluid and/or for performing hydraulically assisted operations at remote locations disposed along or between predetermined paths defined by one or more zippered fluid carrying tubes. Such method and apparatus is especially useful for distributing water for irrigation of crops, and/or for performing other work functions along the zippered tube.

Heretofore, in the irrigation art, several methods of irrigation have been utilized. One of these methods is to use high pressure water distributed onto the crop by one or more sprayers shooting a stream of water at a substantial angle to the earth and in successive stepped angular positions about the point of distribution. With such spraying devices, it has been found difficult to obtain even distribution of the water onto the crops because wind effects alter the distribution patterns causing uneven distribution of water onto the crop resulting in uneven crop growth, and waste of water.

Another disadvantage of the high pressure spraying irrigation system is that it generally requires the use of high pressure pipe which typically is made of aluminum and comes in sections which are joined together to supply water to the spraying device. Such pipe is generally relatively expensive and cumbersome to move about in the field.

Another irrigation method which is commonly used employs a system of irrigation canals or ditches usually constructed of earthen walls. In such a system, water is diverted as needed from a main canal into lesser irrigation ditches from whence water may be diverted via suitable syphons into the heads of rows of crops. With such a system of irrigation ditches, much of the water is lost before it reaches the crops by unwanted seepage. In addition, fields must be carefully prepared by way of leveling and ditching before such a system of ditches may be utilized. Moreover, such a system generally requires constant attention by the person performing the irrigation since the walls of the irrigation ditches are often broken causing certain areas not to receive water while producing flooding of certain other areas of the field.

In one embodiment of the present invention, water is uniformly applied to field crops by providing two zippered plastic tubes straddling the field portion to be irrigated. Water at relatively low pressures is supplied to the zippered tubes. Longitudinally spaced-apart pairs of zippers in each of the tubes provide a pair of openings, one in each of the tubes, which openings travel with movement of the zippers. A piston is placed in each tube, said piston having an opening therein and tubulation leading from the opening in the piston out through the movable opening in the tube to a suitable water spray pipe interconnecting the two spaced-apart zippered tubes. Thus, motive power for moving the water spray pipe is obtained from the pistons which are pushed ahead of and by the flow of water into the spaced zippered tubes and thereby propels the water spray pipe across the field while uniform distribution of water is obtained from the interconnecting spray pipe. Valves are provided for regulating the speed of the pistons.

The advantages of the present invention include a uniform distribution of water onto the crop without wasting water due to wind or undesired seepage. In addition, relatively low pressure water may be utilized and the zippered tubes are relatively lightweight, inexpensive and easily rolled up and moved from one location to another and permit operation over long periods of time with only minimum supervision.

Another advantage of the present invention is that the field need not be carefully leveled as applicant's irrigation apparatus may be employed on quite uneven ground which would be completely unsuitable for a system of irrigation ditches.

In another embodiment of the present invention, additional work functions may be performed by the operating fluids supplied to the system of zippered tubes. Certain of these work functions performed by the working fluid would include providing the motive power for operation of certain mechanical apparatus such as, for example, propelling apparatus for various fluid utilization circuits, seeders, cultivators, harvesters and the like. In addition, liquid fertilizers may be readily applied to the crop through the water distribution system.

The principal object of the present invention is the provision of fluid apparatus for distributing fluid and/or performing work functions at remote loactions from a source of fluid, said fluid apparatus, when propelled, deriving its motive force from an operating fluid within a zippered tubing, the force being derived from an operable connection to the interior of said tubing through a movable opening in the zippered portion thereof.

One feature of the present invention is the provision of method and apparatus for translation of motion through an opening in a zippered tubing, said apparatus including a piston movable within said tubing by means of working fluid applied to one side thereof and including a zipper fastener on the downstream side of said piston operably connected to and movable with said piston for zippering closed the tubing downstream of said plunger whereby the pressure of the operating fluid is maintained on the upstream face of the piston while the downstream portion of said piston is readily accessible to the outside of the tubing via the intermediary of the opening in the tubing, said access opening always remaining slightly downstream of the traveling piston.

Another feature of the present invention is the provision of a fluid passageway in the piston for permitting fluid passsage through the piston from the upstream side thereof to the downstream side thereof and thence to the exterior of said tubing where the fluid may be used for irrigation and/or to perform other work functions.

Another feature of the present invention is the same as any one of the preceding features with the additional provision of a second piston disposed downstream of said first piston and within a zippered portion of the tubing and said second piston being mechanically interconnected with said first piston to provide additional stability to said traveling pistons. In addition, a second zipper fastener is disposed upstream of said second piston and is operatively connected to said interconnected pistons and travels with said pistons to unfasten that portion of the tubing in between said first and second pistons.

Another feature of the present invention is the provision of a pair of longitudinally spaced movable zipper fasteners in the side wall of a zippered tube, the zipper fasteners arranged to define an opening in the side wall of the tube between the zipper fastener pair and arranged such that concerted movement of said zipper pair causes the opening of said tube to move with movement of the zippers. A movable wall is sealed over the opening between the zipper fasteners and is operatively connected to the zipper fasteners, said wall having a passageway therethrough in fluid communication with the interior of the tube. Apparatus is disposed external of the tube and derives its motive force from the flow of fluid from the interior of said tube through the passageway in said movable wall for propelling said wall and connected zipper fasteners along the tube.

Another feature of the present invention includes the provision of mechanical drive apparatus in fluid communication with a piston disposed within a zippered tubulation, said fluid communication being obtained via a fluid passageway in said piston and through a movable opening in the zippered tubulation, the fluid passing through said piston and passageway serving to provide the motivating power for propelling the piston and other equipment along the zippered tubulation.

Another feature of the present invention includes the provision of two space displaced zippered tube portions having a fluid applied thereto, the spaced tube portions being interconnected via a fluid utilization circuit which is propelled along said spaced tube portions via a mechanical apparatus deriving its motivating power from the flow of fluid through said fluid utilization circuit.

Another feature of the present invention is the provision of a movable wall stabilizing apparatus including a wheel riding in engagement with a surface on which a zippered tube rests and said wheel being transversely spaced from said tube and rotatable about an axle connected to said movable wall to prevent canting of the wall about the longitudinal axis of the zippered tube.

Another feature of the present invention is the same as the preceding feature wherein the wheel is driven by a flow of fluid from said zippered tube, said wheel serving to propel said movable wall along said tube.

Figure 14:
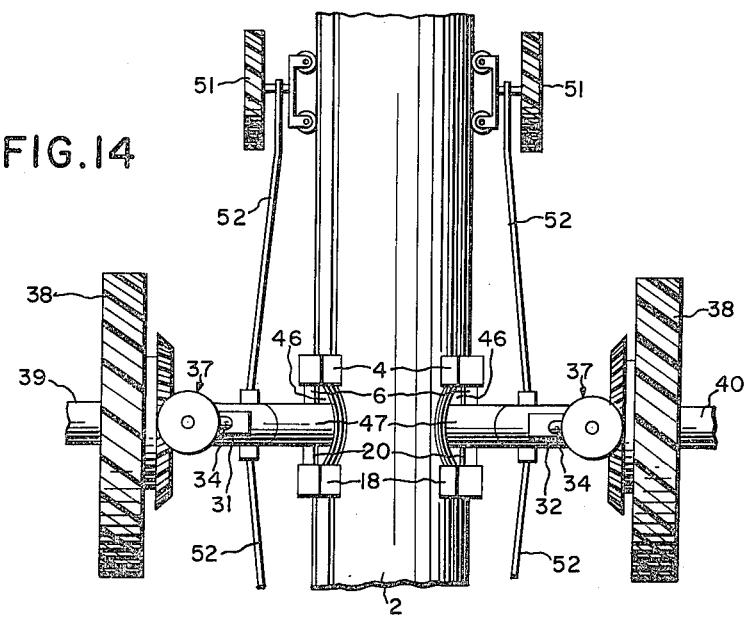
Figure 15:
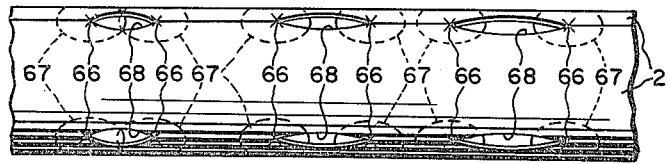
Figure 16:
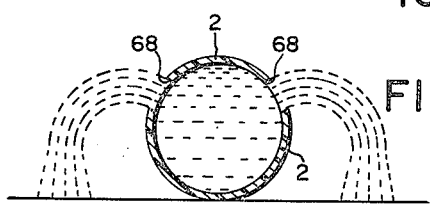

Other features and advantages of the present invention will become apparent upon a perusal of the specification taken in connection with the accompanying drawings wherein:

FIG. 1 is a longitudinal partial cross-sectional view of one embodiment of the present invention, FIG. 2 is a cross-sectional view of a portion of structure 1 taken along line 2—2 in the direction of the arrows, FIG. 3 is a longitudinal partial cross-sectional view of an alternative embodiment of the present invention, FIG. 4 is a side view of an alternative embodiment of the present invention, FIG. 5 is a fragmentary longitudinal cross-sectional view of an alternative embodiment of the present invention, FIG. 6 is a fragmentary longitudinal cross-sectional view of an alternative embodiment of the present invention, FIG. 7 is a cross-sectional view of the structure of FIG. 6 taken along line 7—7 in the direction of the arrows, FIG. 8 is a fragmentary longitudinal side view partly in section of an alternative embodiment of the present invention, FIG. 9 is a cross-sectional view of a portion of the structure of FIG. 8 taken along line 9—9 in the direction of the arrows, FIG. 10 is a top view of a portion of the structure of FIG. 9 taken along line 10—10 in the direction of the arrows, FIG. 11 is a partial cross-sectional view of an alternative embodiment of the present invention, FIG. 12 is a schematic side elevational view of an alternative embodiment of the present invention, FIG. 13 is a cross-sectional view of one embodiment of the present invention, FIG. 14 is a top elevational view of the structure of FIG. 13, FIG. 15 is a longitudinal side elevational view of an alternative embodiment of the present invention, and FIG. 16 is a cross-sectional view of the structure of FIG. 15 taken along lines 16—16 in the direction of the arrows.

Referring now to FIG. 1 there is shown a first embodiment of the present invention. More specifically, piston 1 is carried within an elongated longitudinally zippered tube 2. A source of fluid, not shown, is connected into the zippered tube 2 and supplies fluid under moderate to low pressure to the end of the tube designated at 3. A movable zipper fastener 4 rides in a zipper track and is disposed downstream of the piston 1 and is physically interconnected to the piston 1 through the intermediary of pipe 5. The pipe 5 communicates through the central portion of piston 1 to the upstream side of the piston 1 providing a fluid passageway through the piston 1 from the closed portion to the outside or open portion of tube 2.

The physical connection between the movable zipper fastener 4 and the pipe 5 is made through a suitable mechanical linkage such as arm 6 affixed to the pipe 5 as by clamp 7. The pipe 5 extends a substantial distance upstream of the piston 1 within the tube 2 and is provided with outrigger stabilizing wheels 8 riding in engagement with the inside walls of the closed or fastened portion of tube 2. A spider 9 having radially extending arms is affixed to the pipe 5 and the wheels 8 are mounted at the ends of the arms of the spider 9. The outrigger wheels 8 serve to add stability to the piston 1 and pipe 5 to prevent inadvertent canting of the piston 1 within the tube 2 about an axis transverse to the longitudinal axis of the tube 2.

The movable zipper 4 is arranged such that as the piston 1 travels downstream of the tube 2, the zipper fastener 4 fastens the tubing downstream of the piston 1 and travels in concert with the piston 1 such that the piston 1 always operates within a closed or fastened portion of the zippered tube 2. The pipe 5 extends through the piston 1 and outwardly of the tube 2 through the unfastened portion thereof ahead of the zipper fastener 4 thereby providing passage of fluid through the pipe 5 from the upstream side of the piston 1, the fluid is then made available outside of the tube 2 at remote movable points to perform work or distribute fluid, as for irrigation purposes, as shown in FIG. 2.

The rate at which fluid is supplied outwardly of tube 2 to perform useful work or for irrigation purposes can be readily controlled by the degree to which the pipe 5 is closed off. More specifically, if pipe 5 is fully opened as by a suitable valve, not shown, the maximum amount of fluid will be supplied from the tube 2 per unit length of the tube. As the pipe 5 is closed off, as by the valve, more of the available fluid power will be utilized to propel the piston 1 and other fluid utilization apparatus along the tube 2 such that the amount of fluid supplied from the tube 2 per unit length of the tube traveled by the piston 1 is progessively diminished as the pipe 5 is progressively closed off.

The fluid distribution system shown and described in FIGS. 1 and 2 has special utility for irrigation purposes since it allows the use of a relatively large diameter tube 2 such that water may be utilized in the field at relatively large volumes at relatively low pressures. Moreover, because the tube 2 may be relatively large in diameter the amount of water pressure lost to fluid friction, associated with the side walls of the tube, is substantially diminished over relatively small diameter high pressure systems.

In a preferred embodiment, the tube 2 is formed of a relatively thin, strong, pliable material as of, for example, nylon resin which is relatively inexpensive, lightweight, and when not in use, may be unfastened and rolled up for easy transportation and storage. In certain cases where it is desired to operate at as high a measure as possible to the tube 2 may be reinforced as by nylon webbing formed in the side walls of the tube 2. As an irrigation device, the structure of FIGS. 1 and 2 allows irrigation water to be supplied to a field without the necessity of having a field leveled or graded in a particular way since the tube 2 will allow water to be pushed over quite uneven terrain without loss of water and accompanying uneven distribution of the water due to seepage.

Piston 1, in a preferred embodiment, is formed by a lightweight centrally apertured disk or wall 11 as of, for example, Lucite. A relatively thin walled flexible cup-shaped member 12 as of, for example, tetrafluoroethylene resin envelopes the outer periphery of the disk 11 and is held thereto by being sandwiched between the disk 11 and a ring 10. The free end or lip of the flexible cup member 12 is preferably disposed on the upstream side of the disk 11 forming a seal between the outer periphery of the disk 11 and the inner surface of the tube 2, the fluid pressure on the upstream side of the cup 12 forces the lip portion thereof outwardly against the inner surface of the tube 2 to form a seal. The slippery characteristic of tetrafluoroethylene serves to provide a low frictional bearing surface between the outer lip portion of the cup 12 and the inner surface of the tube 2 while sealing the piston 1 within the tube 2.

In use, the tube 2 may be laid out across the field, which it is desired to irrigate, the piston assembly 1 inserted within the tube 2 and the zipper 4 attached to the pipe 5 by the arm 6 and water applied to the upstream side of the piston 1. The piston will then travel the full length of the tube 2 distributing its water into a suitable irrigation system which may comprise, for example, a plurality of irrigation channels intersecting at right angles with the path of the tube 2. The speed with which the piston 1 moves across the field through the tube 2 may be readily controlled by regulating the flow of fluid through pipe 5 and/or by regulating the water pressure applied to the upstream side of the piston 1.

Referring now to FIG. 3 there is shown an alternative embodiment of the present invention. The embodiment of FIG. 3 is substantially similar to that of FIG. 1 with the exception that stability for the piston 1 is not obtained through the stabilizing spider 9, as shown in FIG. 1, but instead piston stability is obtained by a second piston 15 disposed within a fastened section 16 of the tube 2 downstream of the source of fluid. The downstream zippered section 16 of tube 2 is preferably filled with fluid and as the piston 1 moves through the tube 2 by pressure derived from the source, fluid is displaced out of the tube section 16 through a suitable pressure relief valve 17. The pressure, as set by valve 17, serves as one means for controlling the speed of the piston 1. The weight of the fluid in the downstream section 16 of the tube 2 lends additional stability to the fluid distribution system.

Downstream stabilizing piston 15 is connected to a second movable zipper fastener 18 which is slightly spaced downstream from the first zipper 4. Zipper fastener 18 is arranged such that with downstream movement of the piston 1, zipper fastener 18 unfastens the tube 2. Zipper 18 may be connected to the piston 15 via a suitable linkage such as, for example, chain 19. The zipper 18 may also be connected to the outflow pipe 5 via a suitable mechanical device such as a rod 20 affixed to the pipe 5 interconnecting the zipper 18 and the pipe 5.

Pipe 5 is supported from piston 15 via a closed tubular member 21 suitably interconnecting the elbow of pipe 5 and the center of the piston 15. As in the example of FIG. 1, the piston 15 includes a center disk 22 with an outer flexible or pliable cup member 23, as of tetrafluoroethylene sheet, being arranged in slidable engagement with the inner wall of the tube 2 and serving to seal off the downstream side of piston 15 and section 16 of tube 2.

Referring now to FIG. 4 there is shown an alternative embodiment of the present invention. This embodiment is substantially the same as that shown in FIG. 1 with the exception that the pipe 5 is closed such that water is not allowed to escape therethrough and the end of the pipe is provided with a suitable fitting such as an eye 24 for connection to a suitable vehicle, not shown, to pull or push such vehicle at locations remote from the source of water and thus perform work externally of the tube 2. As in the previous embodiments, the water or suitable working fluid is fed into the tube 2 at end 3 causing the piston 1 to move the pipe 5 and eye 24 together with the work load attached thereto along the tube 2. As the piston 1 moves through the tube 2, the zipper 4 closes the tubing slightly downstream of the piston 1 while allowing the pipe 5 to emerge through the open tube 2 slightly downstream of the piston 1 thereby transmitting work force from the working fluid to the eye 24 externally disposed of the tube 2.

Referring now to FIG. 5 there is shown an alternative embodiment of the structure of FIG. 4 wherein additional stability for the piston 1 is obtained in a manner as previously described with regard to FIG. 3; namely, through the intermediary of a second piston 15 located downstream of the first piston 1. As in the previous embodiment, the downstream portion of the tubing 2 at 16 may be filled with fluid, if desired, for additional stability or merely left partially filled or empty. A fluid, if any, existing within the tube 2, in the downstream portion thereof at 16, as in the previous embodiment of FIG. 3, may be released from the closed downstream portion of the tubing 16 at a controlled rate, as determined by a pressure relief valve 17 or faucet thereby regulating the speed with which the piston 1 travels lengthwise of the tube 2 and thus the speed of the load attached to fitting 24.

Referring now to FIGS. 6 and 7 there is shown an alternative embodiment of the present invention. In this embodiment a suitable source of fluid, not shown, supplies fluid to the zippered tube 2 at 3. A piston 27 is slidable within the zippered tube 2. A central opening 28 in the piston 27 is in fluid communication with a water discharge pipe 29 which pipe is provided with an elbow and a vertically directed portion. The pipe 29 terminates in a T with horizontally extending pipe segments 31 and 32 in fluid communication with the vertically directed portion of pipe 29. A turbine 33 drives a shaft 34 which extends outwardly of the T at 35 through a suitable shaft seal 36. The shaft 34 drives two wheels 38 rotatably about the horizontally directed pipe sections 31 and 32, respectively, through a suitable gear train 37. The wheels 38 ride on the ground and serve to drive the piston 27 longitudinally within the zippered tube 2. As in the previous example, the zipper fastener 4 is pulled via mechanical linkage 6 clamped to the pipe 29.

Fluid, which is supplied to the upstream side of the piston 27, flows through the pipe 29, turbine 33, thence through the horizontally directed pipe sections 31 and 32 and is then distributed via outlets 39 and 40 to a suitable irrigation system or other water utilization circuit, not shown. The piston 27 may be driven either upstream or downstream of the zippered tube 2 by a proper selection of either a forward or reverse drive as determined by the gear train 37. By provision of a suitable gear train and shift lever, not shown, the piston 27 with its associated drive wheels 38 and distribution outlets 39 and 40 may be driven downstream to a certain point at which point a member which may be attached to the tube 2, trips the reversing shift lever causing the water distribution system including the piston 27 to go into reverse and to travel back upstream of the zippered tube 2.

As in the previous example, as shown in FIGS. 1 through 3, additional piston stabilizing apparatus such as rollers 8 and a spider 9 and/or stabilizing piston 15 may be affixed to the piston 27 for increasing the stability of the piston 27 within the tube 2. Also, as in the previous examples, the downstream portion of the tube 16 may be filled with water or other liquid to aid stability of the system in a manner as previously described with regard to FIG. 3. In addition, a separate wheel or pair of wheels disposed outside of the tube 2 may be used to stabilize the piston 27, as shown in phantom lines of FIG.

6. The stabilizing wheels will be more fully described below.

Referring now to FIGS. 8 through 10 there is shown another embodiment of the present invention. More specifically, this embodiment is similar in many respects with the structure of FIGS. 6 and 7 with the exception that the piston 27 of the previous embodiment has been replaced by a centrally apertured movable side wall portion 46. As in the previous embodiment of FIG. 3, zippers 4 and 18 define a movable opening in the zippered tube 2, the movable side wall 46 is preferably formed of a relatively rigid material having a preset semicylindrical shape. A pliable flexible margin 45 of the semicylindrical wall 46 is preferably made of a low frictional material as of, for example, tetrafluoroethylene and rides on the inside of the zippered tube 2 forming a watertight seal between the movable wall 46 and the inside of the tube 2.

A central opening is provided in the movable wall 46 and is placed in fluid communication with a pipe 47 extending outwardly and preferably upwardly from the zippered tube 2. As in the previous embodiment of FIGS. 6 and 7, a turbine 33 drives a shaft 34 which is sealed in a packed journal at the end of the shaft 34 which extends externally of the pipe 47 and serves to drive two wheels 38 through the intermediary of a suitable gear train. As in the previous example, the fluid leaves the tube 2 through the central opening in the wall 46, drives the turbine 33, and then passes into horizontally directed pipe sections 31 and 32 and thence to outlets 39 and 40, respectively. As in the previous example, the rate at which the irrigation water may be supplied to the field may be readily determined by the gear ratio of the drive mechanism 37 and/or by the fluid pressure applied to the tube 2.

The wall 46 is stabilized against tendencies to revolve about an axis transverse to the longitudinal axis of the tube 2 by moving the drive wheels 38 upstream of the movable wall 46 and providing a second pair of wheels 51, as in the tricycle, downstream of the movable wall 46. The second set of wheels 51 are preferably disposed straddling the tube 2 and are connected back to the vertically rising pipe 47 through the intermediary of a boom 52. The wheels 51 are preferably pivotably mounted with respect to the boom 52 to readily allow the wheels 51 to track the tube 2. Other stabilizing apparatuses may be provided by outrigger devices, as spider 9, similar to those shown in FIG. 1 carried within the tube 2 and supported on a cross arm of a T from the wall 46, as shown in phantom lines.

Referring now to FIG. 11 there is shown another embodiment of the present invention. In this embodiment, two zippered tubes 2 are disposed straddling a certain area of field that it is desired to irrigate or otherwise perform work upon. Piston assemblies 1 and 15, as shown in FIG. 3, are carried within the tubes 2. Pipes 5 emerge outwardly of the tubes 2 through movable unfastened portions thereof defined between the pairs of movable zipper fasteners 4 and 18 which are carried along with the movable pistons 1.

A fluid utilization circuit 55 such as, for example, a water spraying pipe 56 interconnects the two spaced pipes 5. Spray pipe 56 carries a plurality of spaced nozzles arranged to provide overlapping sprays of water resulting in uniform distribution of water onto the crop being irrigated.

The spray pipe 56 is provided with accordion-like or bellows sections 57 to allow for a certain degree of convergence and divergence of the spaced zippered tubes 2. Sliding joints 58 bridge the accordion sections 57 and serve to maintain the spray pipe 56 relatively rigid in an axis transverse to its longitudinal axis. Wheels 59 are carried from the spray pipe 56 at suitable intervals along its length and serve to support the weight of the spray pipe 56. The wheels 59 are preferably of relatively large diameter and are of very lightweight construction, as in the nature of a bicycle wheel provided with relatively wide tread at 61 to facilitate movement of the spray pipe 56 over relatively rough and soft terrain.

The driving force for moving the spray pipe 56 along the tubes 2 is obtained via pistons 1 which serve to transmit their motive force to the spray pipe 56 via slideable joint sections 58. The joint sections 58 are pivoted at their ends to permit spray pipe 56 to move up and down with respect to the relative position of the zippered tubes 2, as may be required in certain applications to rough terrain.

Control valve assemblies 62 are provided at the junction of the spray pipe 56 with pipes 5. Control valve assemblies 62 are controlled by the angular displacement of the spray pipe 56 away from a perpendicular drawn from the longitudinal tubes 2. Each control valve is arranged to increase the back pressure on its associated piston 1 when its associated piston is upstream of that position giving a perpendicular relationship between spray pipe 56 and the tube 2. Increasing the amount of pressure drop available for driving the piston 1 causes the associated piston 1 to speed up and allow the spray pipe 56 to approach the perpendicular. Thus, the angularly controlled valves 62 tend to maintain spray pipe 56 perpendicular with respect to the two spaced zippered tubes 2.

In another embodiment of the structure of FIG. 11, the pistons 1 would be replaced by the movable wall 46 as shown in FIGS. 8 through 10. Motive power for the water utilization circuit 55 would then be provided through suitable drive mechanisms as shown in FIGS. 8 through 10 deriving their motive power from the flow of fluid from the spaced tubes 2 and through the water utilization circuit 55. As in the apparatus of FIG. 11, suitable angularly controlled flow valves or drive mechanism would serve to maintain the water utilization circuit 55 in a condition substantially perpendicular or at another prescribed angular relationship with the longitudinal axes of the spaced tubes 2.

In another embodiment, the water utilization circuit 55 may well include merely mechanical devices such as weeders, seeders, and the like which would derive their motive force from the flow of fluid through the water utilization circuit 55. The working fluid then would be freely circulated from one of the tubes 2 through the water utilization circuit and back to the fluid source such as, for example, a pump, not shown, via the other spaced zippered tube 2, thus completing a closed fluid circuit.

It is further within the scope of the present invention that a plurality of fluid utilization circuits 55, not shown, may be placed at spaced locations lengthwise of the spaced tubes 2 for performing successive spaced displaced and time displaced work functions. More specifically, a first water utilization circuit would serve to seed the crop while a subsequent water utilization circuit placed upstream of the first, and connected in parallel with the first utilization circuit, serves to irrigate the seeded crop while still a third water utilization circuit disposed upstream of the second utilization circuit serves to cultivate the growing crop.

Referring now to FIG. 12 there is shown another embodiment of the present invention. More specifically, a zippered tube 2 is provided with suitable source of water or other working fluid at the upstream end 3 thereof. A plurality of movable zipper fastener pairs are provided at spaced intervals along the length of the tube 2. Each pair of zipper fasteners include a first zipper fastener 65 which is arranged to fasten the tubing when moved downstream. A second zipper fastener 66 of each pair is arranged to unfasten the zippered tube 2 when moved downstream of the tube 2. The zippers 65 and 66 preferably include an internal flange 67 of relatively thin flexible material as of sheet tetrafluoroethylene resin to form a seal over the opening between zipper fasteners when the fasteners are moved close together. The zippers of each pairs 65 and 66 serve to provide, in the space between the zippers, an opening 68 in the tubing which may be variably opened or closed as desired by relative movement of each zipper fastener pair. Thus, the zipper pairs provide, lengthwise of the tube 2, a plurality of openings 68 in the tube 2, the size of the openings 68 being variably controlled by either moving together or opening up the space between the zippers 65 and 66 of each zipper pair.

The structure of FIG. 12 has particular utility for irrigation since it provides an irrigation pipe with a great many variably controllable faucets, the location of the faucets being controlled as desired as well as the amount of flow therefrom. The tube 2 may be laid out across the field, it is desired to irrigate, as across a system of irrigation canals or furrows, the zippers 65 and 66 being arranged to provide a flow of fluid from the tube 2 to the head of each of the furrows and the amount of fluid falling into each furrow being variably controllable.

Another feature applicable to all the embodiments of the present invention is that the zippered tube 2 may be made up of two or more longitudinally directed circumferentially spaced zippered segments fastened together along adjacent side edges by zipper fasteners as shown in FIGS. 13 and 14. In this manner, tube 2 may be readily made to have various diameters, as desired, by zippering together the desired number of segments. This latter feature, when applied to the structure of FIG. 12, as shown in FIGS. 15 and 16 will permit the use of movable zipper fastener pairs in the one or more additional longitudinally directed zipper tracks providing additional faucets, the additional faucets being circumferentially spaced apart from a first set of faucets, as shown, and thus readily permitting fluid to be taken from opposite sides of the tube 2.

This later feature is also especially applicable to the embodiments tof FIGS. 8 through 10 since it will provide two or more circumferentially spaced longitudinally directed zipper tracks along which tracks may be propelled movable walls 46. In such a case, the walls 46 may pass each other in the tube 2 see FIGS. 13 and 14.

Since many changes could be made in the above construction and many widely different embodiments of the invention could be made without departing from the scope thereof, it is intended that all matter contained in the above description or shown in the accompanying drawings shall be interpreted as illustrative and not in a limiting sense.

What is claimed is:

1. In a relatively low pressure fluid conduit apparatus, means forming a relatively thin elongated pliable tube having mating side edges, means forming a zipper extending longitudinally of said tube for fastening together said tube means, said zipper means including a movable fastener means for fastening the mating side edges of said tube means, said tube means having a fastened tube portion behind said movable fastener means and an unfastened tube portion ahead of said movable fastener means, means forming a wall movable within said tube means and serving as a partition between said unfastened tube portion of said tube means and said fastened portion of said tube means, and means forming an operable physical connecting link between said movable fastener means and said movable wall means to cause said movable fastener means to move in concert with said movable wall means, said movable wall means having an opening therethrough, said opening defining a fluid passageway out of said zippered tube and communicating through said wall into the fastened poriton of said zippered tube, and means physically operable by application of fluid at relatively low pressure to the fastened portion of said zippered tube producing a driving force physically transmitted to said movable wall for propelling said movable wall along said zippered tube.

2. The apparatus according to claim 1 wherein said movable wall means is transversely directed of said tube and forms a piston being driveable along said tube by applying a pressure differential across said piston effected by application of fluid pressure to the fastened portion of said tube.

3. The apparatus according to claim 1 wherein said zipper means includes a second movable fastener longitudinally spaced from said first movable fastener means, and means forming an operative mechanical connection between said second fastener means and said movable wall means to cause said second movable fastener to move in concert with said movable wall, and the space between said first and second movable fasteners defining a movable opening in said tube, said movable opening moving in concert with said movable wall.

4. The apparatus according to claim 3 wherein said movable wall forms a partition having an axial extent in excess of the axial extent of said opening defined by the unfastened tube portion between said spaced movable fasteners, said movable wall serving to close off said movable opening 5. The apparatus according to claim 4 wherein said movable wall includes a flexible relatively thin portion forming a substantially fluid-tight seal between said movable wall and the inside wall of said closed portion of said tube by being pressed against said tube by the pressure of fluid within said tube.

6. The apparatus according to claim 1 including, means operatively and mechanically connected to said movable wall and longitudinally displaced along said tube from said movable wall for stabilizing said movable wall against rotation about an axis transverse to the longitudinal axis of said elongated zippered tube.

7. The apparatus according to claim 6 wherein said stabilizing means is disposed within a fastened portion of said zippered tube.

8. The apparatus according to claim 6 wherein said stabilizing means is disposed externally of a fastened portion of said tube.

9. The apparatus according to claim 8 wherein said tube stabilizing means includes a wheel adapted to ride in engagement with a surface serving to support said elongated tube.

10. A fluid conduit apparatus including, means forming a first elongated pliable tube portion, means forming a zipper extending longitudinally of said first tube portion for fastening together said tube portion, said first zipper means including a first movable fastener means for fastening the side edges of said tube means, said first movable fastener means defining a closed tube portion behind said movable fastener means and an open tube portion ahead of said movable fastener means, means forming a movable wall within said tube means and serving as a partition between said open tube portion of said tube means and said closed tube portion of said tube means, means forming an operable mechanical connection between said movable fastener means and said first movable wall means to cause said movable fastener means to move in concert with said movable wall means, a second elongated pliable tube portion transversely spaced apart from said first tube portion, a second zipper fastener means extending longitudinally of said second tube portion for fastening together said second tube portion, a second movable wall movable within said second tube portion, a fluid utilization circuit interconnecting said first and second zippered tube portions and deriving its working fluid from passageways in said first and second movable walls, and means for propelling said utilizing circuit lengthwise of said first and second tube portions.

11. A fluid conduit apparatus including, means forming an elongated relatively thin pliable tube having longitudinally directed mating marginal side edge portions, means forming a zipper extending longitudinally of said tube for fastening together said mating edge portions of said tube means, said zipper means including a first movable fastener means for fastening the side edges of said tube means, said movable fastener means serving to form a closed tube portion behind said movable fastener means and an open tube portion ahead of said movable fastener means, means forming a wall movable within said tube means and serving as a partition between said open tube portion of said tube means and the closed portion of said tube, means forming an operable mechanical connection between said movable fastener means and said movable wall means to cause said movable fastener means to move in concert with said movable wall means, said movable wall means having a passageway therein for passage of fluid therethrough, means disposed externally of said tube means in fluid communication with the closed portion of said tube means through said passageway in said movable wall means for producing a driving force and for transmitting said driving force to said wall for driving said movable wall means longitudinally along said zippered tube means, and said wall driving means deriving its power to produce its driving force from the flow of fluid through said movable wall at relatively low pressure.

12. The appartus according to claim 11 wherein said wall driving means includes a turbine driven by the flow of fluid through said movable wall, and a wheel external of said tube driven from said turbine.

13. The apparatus according to claim 12 including a second wheel, said first and second whels disposed straddling said tube to stabilize said movable wall against rotation about the longitudinal axis of said tube.

14. The method for performing work functions at locations remote from a source of fluid comprising the steps of, connecting a relatively thin pliable zippered tube to the source of fluid, laying out the zippered tube to the work location remote from the fluid source, movably partitioning the zippered tube into an upstream portion and an unfastened downstream portion, flowing fluid through a fluid passageway which communicates between the upstream portion of the zippered tube and the outside of the tube through movable partition with the upstream portion of the tube being in pressurized fluid communication with the source of fluid at relatively low fluid pressures, and the downstream unfastened portion of the tube including an unfastened portion of the zippered tube being disposed downstream of a movable zipper fastener and also downstream of at least a portion of the movable partition, physically interconnecting by a mechanical linkage the movable partition and the movable zipper fastener to cause the partition and zipper fastener to move in concert, directing a flow of fluid at relatively low pressure into the upstream partitioned portion of the zippered tube from the fluid source, and utilizing the flow of fluid into the tube and through the fluid passageway in the partition at relatively low pressure for producing a driving force physically transmitted to the movable partition for propelling the movable partition along the tube to the remote location.

15. The method according to claim 14 including the steps of, drawing fluid from the closed portion of the tube through the movable partition, and applying the fluid to selected remote locations externally of the tube.

16. A piston apparatus for use within an elongated pliable relatively thin zippered tube having a movable zipper fastener including, a wall member adapted to partition the zippered tube into a closed upstream portion and an open downstream portion thereof, said wall member including a fluid passageway therethrough for passage of fluid from the upstream side of said wall member to the outside of the zippered tube through said fluid passageway therein, means for propelling said wall member downstream of the tube within the closed upstream portion thereof by application of fluid pressure at relatively low pressure to the upstream side of said wall, said wall member having a relatively thin flexible margin portion adapted to ride in slideable engagement with the interior side walls of the tube in substantially fluid sealed relationship therewith to prevent substantial fluid leakage around the outside periphery of said wall member, and means forming a mechanical linkage for connecting the movable zipper fastener to said wall member to cause the zipper fastener to move in concert with said wall member.

17. The apparatus according to claim 16 including, means spaced apart from said wall member and adapted for riding in engagement with the inside walls of a fastened portion of the zippered tube, and means rigidly interconnecting said spaced apart stabilizing means and said wall member for stabilizing said wall member against canting about an axis transverse to the longitudinal axis of the zippered tube.

18. A movable wall apparatus for use within an elongated pliable relatively thin zippered tube having a pair of movable zipper fasteners defining a movable opening therebetween including, a wall member adapted to close off the movable opening in the zippered tube, said wall member being movable and having a relatively thin flexible margin portion adapted to ride in slideable engagement with the interior side walls of the tube in substantially fluid sealed relation therewith to prevent substantial fluid leakage around the outside periphery of said movable wall member, means for mechanically connecting said wall member to the movable zipper fasteners of the zippered tube to cause the pair of movable zipper fasteners and thus the opening in the zippered tube to move in concert with said wall member, said wall member having an opening therein for fluid communication between the inside of the zippered tube and the outside of the tube through the movable opening to allow fluid to be distributed outwardly of the zippered tube at movable remote locations and means operable by application of fluid at relatively low pressure to said tube for producing a driving force physically transmitted to said wall for propelling said wall member longitudinally of said tube.

19. The method of supplying fluid to remote locations from a source of fluid comprising the steps of, connecting a zippered tube to the source of fluid, laying out the zippered tube along a path to the places where it is desired to supply fluid outwardly of the tube, unfastening portions of the zippered tube with pairs of movable zipper fasteners the unfastened portions of the tube between zipper fasteners of each pair defining fluid outlets disposed at a multiplicity of points lengthwise of the tube, the fluid outlets being individually variable as to flow capacity and location by movement of the zipper fasteners.

20. Fluid apparatus for distributing fluid from a source of fluid to remote locations including, an elongated zippered tube adapted to be connected to the fluid source and to extend to the remote locations where it is desired to distribute the fluid outwardly of said zippered tube, a multiplicity of pairs of movable zipper fasteners serving to fasten and unfasten said zippered tube and movable longitudinally thereof along a zipper track, said pairs of zipper fasteners defining a plurality of movable openings in said zippered tube between zipper fasteners of each pair, said movable openings defining a multiplicity of fluid outlets and said fluid outlets being individually variable as to fluid flow capacity and location by movement of the zipper fasteners.

21. Fluid apparatus for distributing fluid from a source of fluid to a remote location including, an elongated zippered tube adapted to be connected to the fluid source and to extend to the remote location where fluid is to be distributed outwardly of said zippered tube, a pair of movable zipper fasteners movable along a zipper track, one of said movable zipper fasteners serving to fasten said zippered tube and the other zipper fasteners serving to unfasten said zippered tube when both fasteners are moved in the same direction along said zipper track, said pair of fasteners defining a movable opening in said zippered tube between each zipper fastener of said pair of fasteners, and a second tube intersecting said first zippered tube at said movable opening in said zippered tube, said second tube having an outwardly directed flange with a flexible portion disposed inside said zippered tube and adjacent the fastened inside walls thereof, said flexible flange portion adapted to conform to the shape of the inside walls of said zippered tube and to form a substantially fluid-tight seal between said flange and said zippered tube by being pressed against the inside wall of said zippered tube by fluid pressure within said zippered tube, and said second flanged tube having a passageway therein communicating into said zippered tube serving as a fluid passageway out of said zippered tube for distributing fluid outwardly of said zippered tube, and means operable by the application of fluid to said zippered tube for propelling said second flanged tube longitudinally of said zippered tube.

22. Apparatus according to claim 21 including means forming an operable mechanical connection link between said pair of zipper fasteners and said flanged tube to cause said zipper fasteners to move in concert with accompanying movement of said flanged tube longitudinally of said elongated tube.

23. Apparatus according to claim 21 wherein said zippered tube includes a second zipper track transversely spaced apart from said first zipper track.

References Cited by the Examiner

UNITED STATES PATENTS

| | | | |
|---|---|---|---|
| 2,502,487 | 4/1950 | Scholl | 92—88 |
| 2,747,932 | 5/1956 | Volk. | |
| 2,974,876 | 3/1961 | Poynor | 137—355.12 X |
| 3,019,813 | 2/1962 | Dommann | 137—580 |

M. CARY NELSON, *Primary Examiner.*

WILLIAM F. O'DEA, *Examiner.*